Figure 1:
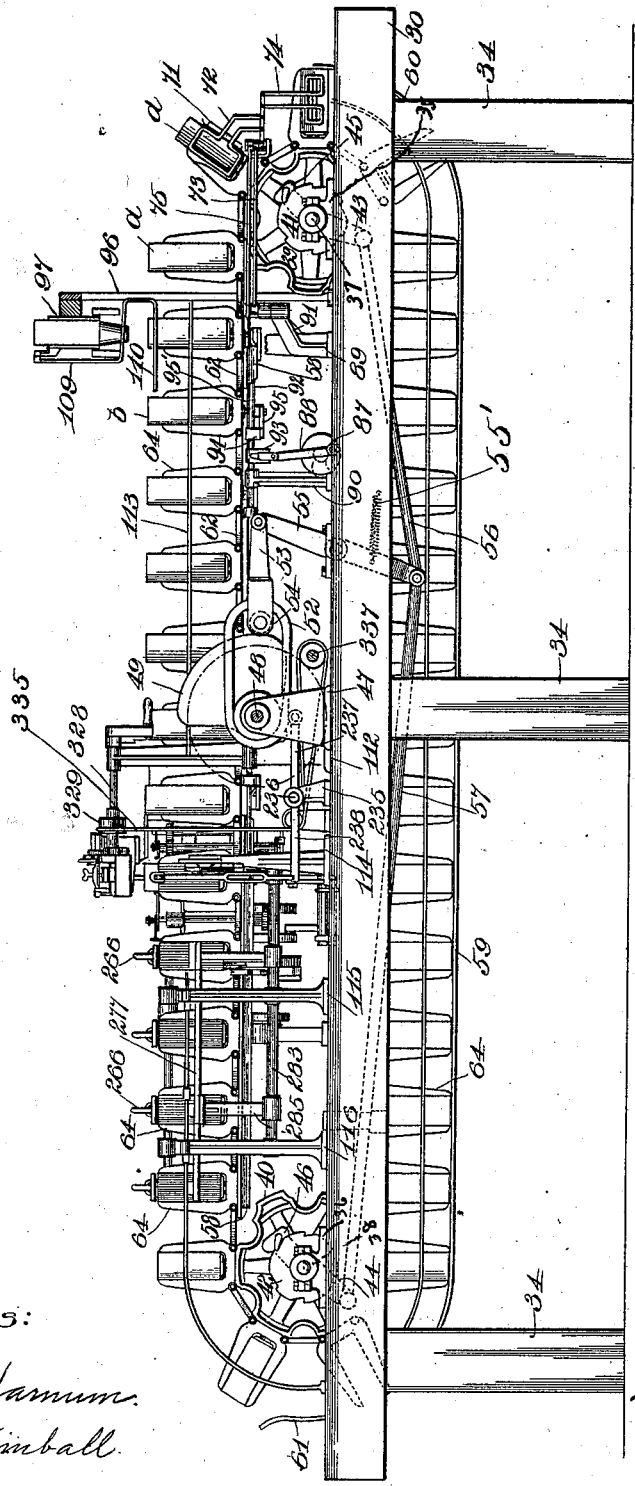

No. 724,230. PATENTED MAR. 31, 1903.
G. R. WYMAN.
PACKING MACHINE.
APPLICATION FILED AUG. 12, 1902.
NO MODEL. 11 SHEETS—SHEET 1.

Witnesses:
Wm. H. Varnum.
N. G. Kimball.

Inventor:
George R. Wyman
By Henry J. Miller
atty

No. 724,230. PATENTED MAR. 31, 1903.
G. R. WYMAN.
PACKING MACHINE.
APPLICATION FILED AUG. 12, 1902.
NO MODEL. 11 SHEETS—SHEET 2.

Witnesses:
Wm. H. Varnum
N. G. Kimball

Inventor:
George R. Wyman,
By Henry J. Miller
atty.

No. 724,230. PATENTED MAR. 31, 1903.
G. R. WYMAN.
PACKING MACHINE.
APPLICATION FILED AUG. 12, 1902.
NO MODEL. 11 SHEETS—SHEET 5.

Witnesses:
Wm. H. Varnum.
N. G. Kimball

Inventor:
George R. Wyman
By Henry J. Miller
atty

No. 724,230. PATENTED MAR. 31, 1903.
G. R. WYMAN.
PACKING MACHINE.
APPLICATION FILED AUG. 12, 1902.
NO MODEL. 11 SHEETS—SHEET 7.

Witnesses:
Wm. H. Varnum.
N. G. Kimball.

Inventor:
George R. Wyman
By Henry J. Miller
atty.

No. 724,230. PATENTED MAR. 31, 1903.
G. R. WYMAN.
PACKING MACHINE.
APPLICATION FILED AUG. 12, 1902.
NO MODEL. 11 SHEETS—SHEET 8.
Fig. 9.
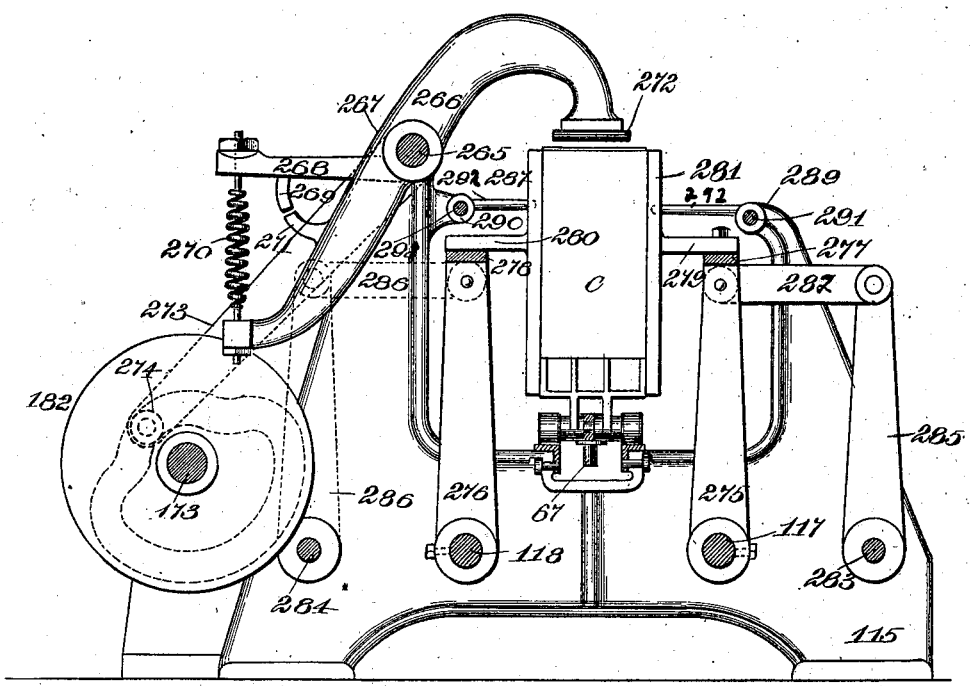
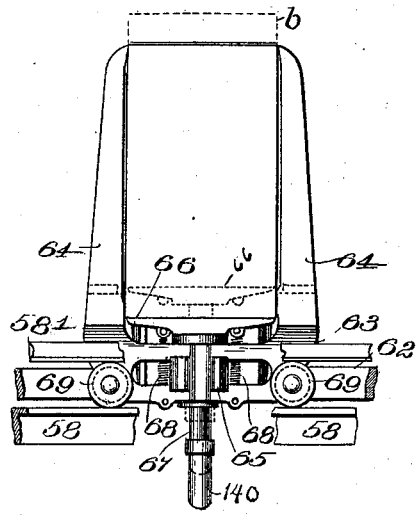
Fig. 10.
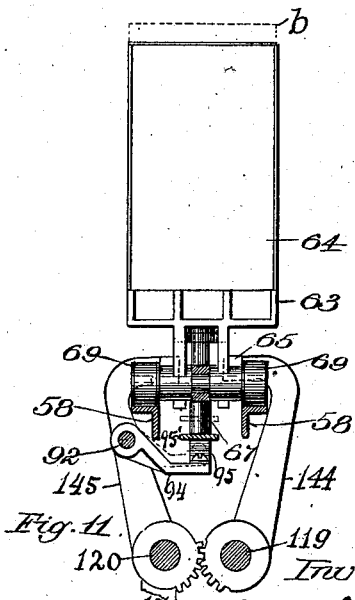
Fig. 11.
Witnesses:
Wm. H. Varnum.
N. G. Kimball.
Inventor:
George R. Wyman
by Henry J. Miller
atty.

No. 724,230. PATENTED MAR. 31, 1903.
G. R. WYMAN.
PACKING MACHINE.
APPLICATION FILED AUG. 12, 1902.
NO MODEL. 11 SHEETS—SHEET 9.

Witnesses:
Wm. H. Varnum.
N. G. Kimball.

Inventor:
George R. Wyman
By Henry J. Miller
atty

No. 724,230. PATENTED MAR. 31, 1903.
G. R. WYMAN.
PACKING MACHINE.
APPLICATION FILED AUG. 12, 1902.
NO MODEL. 11 SHEETS—SHEET 10.
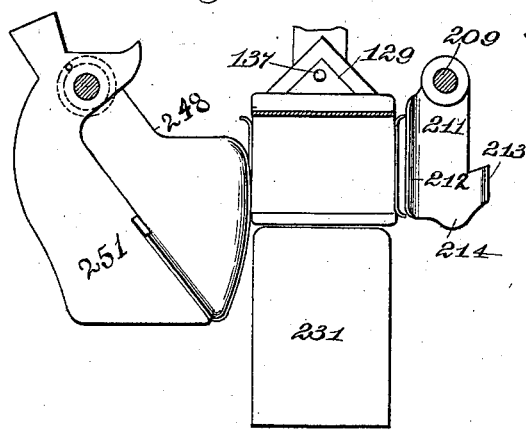
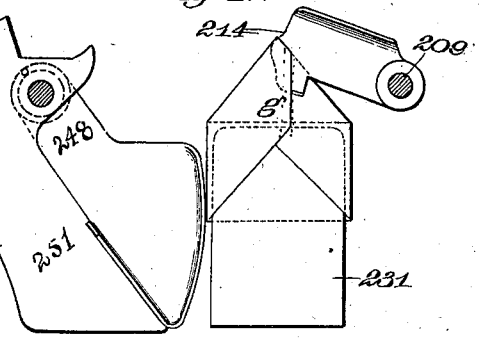
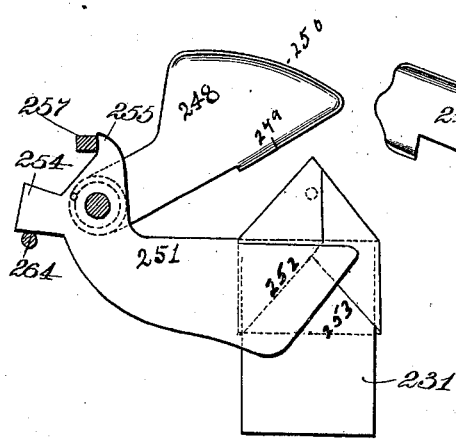
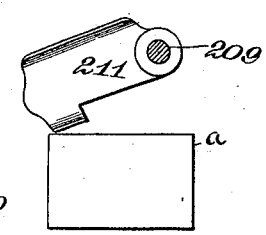
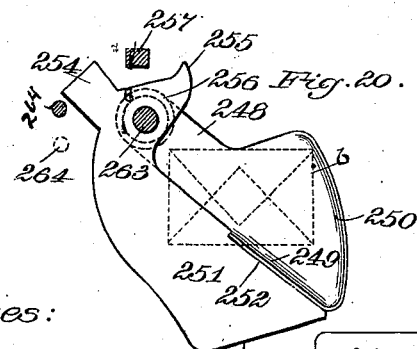
Witnesses:
Wm. H. Varnum.
N. G. Kimball.
Inventor.
George R. Wyman
By Henry J. Miller
atty

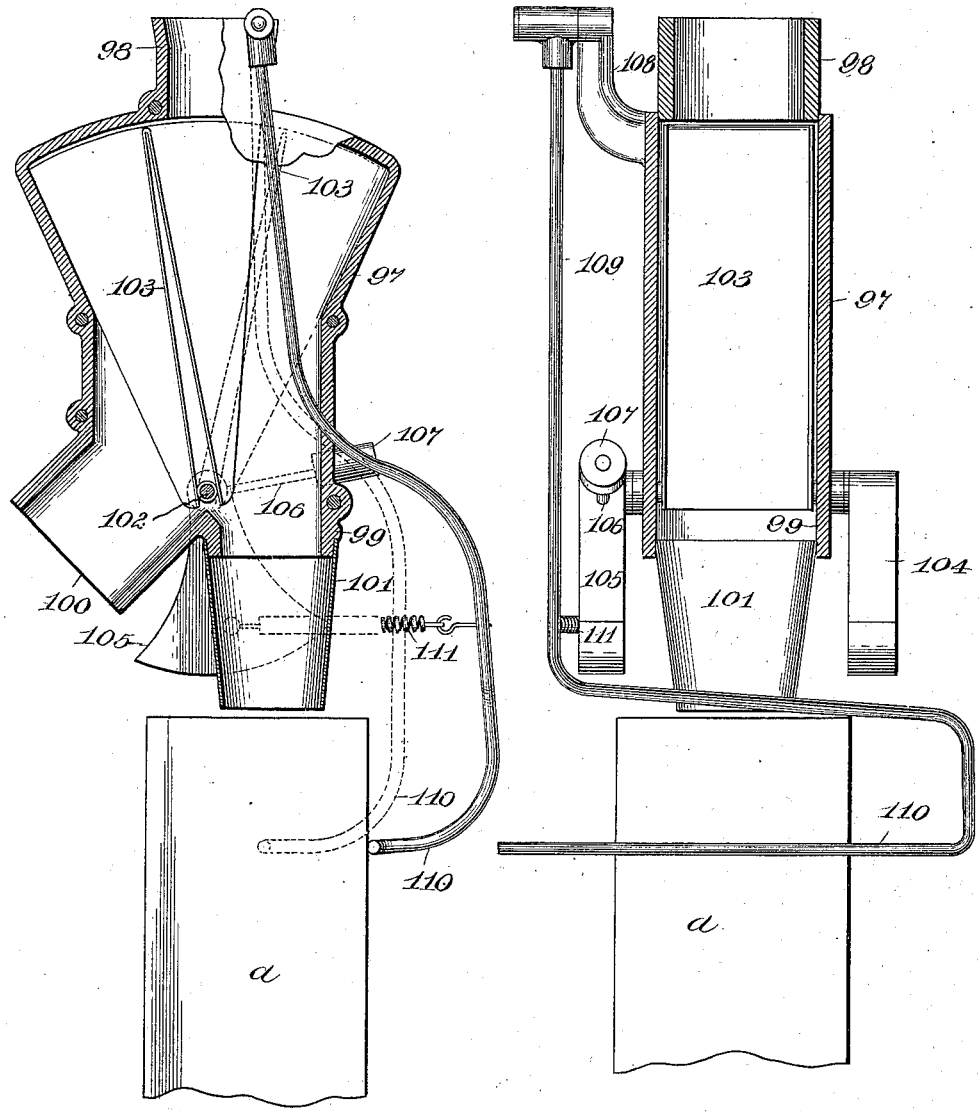

UNITED STATES PATENT OFFICE.

GEORGE R. WYMAN, OF EAST WALPOLE, MASSACHUSETTS, ASSIGNOR TO F. W. BIRD & SON, OF EAST WALPOLE, MASSACHUSETTS, A FIRM.

PACKING-MACHINE.

SPECIFICATION forming part of Letters Patent No. 724,230, dated March 31, 1903.

Application filed August 12, 1902. Serial No. 119,427. (No model.)

*To all whom it may concern:*

Be it known that I, GEORGE R. WYMAN, a citizen of the United States, residing at East Walpole, in the county of Norfolk and State of Massachusetts, have invented certain new and useful Improvements in Packing-Machines, of which the following is a specification, reference being had therein to the accompanying drawings.

This invention relates to improvements in machines for packing granular materials, the invention relating particularly to improvements in machines adapted to receive empty wrappers closed at the bottoms and having open foldable top portions, to carry such wrappers to a position where they are successively supplied with a predetermined amount of the granular material, to shake said material to reduce the height of the same in the wrapper, to slightly compress the filled package laterally, to fold the top down, to supply glue or other adhesive material to the portions of the top as such portions are folded or slightly subsequent to such folding, to maintain a pressure on such glued portions after the folding and gluing and at the same time to slightly compress the packages laterally, whereby the approximate level of the material is maintained, and to finally deliver the complete packages in position for convenient handling for further packing.

The object of the invention is to carry out these several steps as a progressive operation.

Another object of the invention is to improve the several independent mechanisms by which the successive steps are carried into effect.

Another object of the invention is to improve the mechanism as regards detector mechanism, whereby the absence of a wrapper is detected and waste of the material is avoided.

Another object of the invention is to adjust the lateral-pressure devices with reference to the lateral dimensions of the filled package.

Another object of the invention is to improve the means for positioning the filled package prior to the closing of the top thereof.

Another object of the invention is to improve the folding mechanism and the gluing or cementing devices.

Other objects of the invention will appear from the following description and claims.

The invention consists in the peculiar construction of the several parts of each independent group of mechanism and in the combination of said parts.

The invention also consists in the peculiar combination of such of the independent groups of mechanism as may for this particular purpose be brought into dependent relation to carry out the progressive operation.

The invention also consists in such other novel features of construction of particular parts and in the combination thereof, as shall hereinafter be more fully described, and pointed out in the claims.

Figure 2:
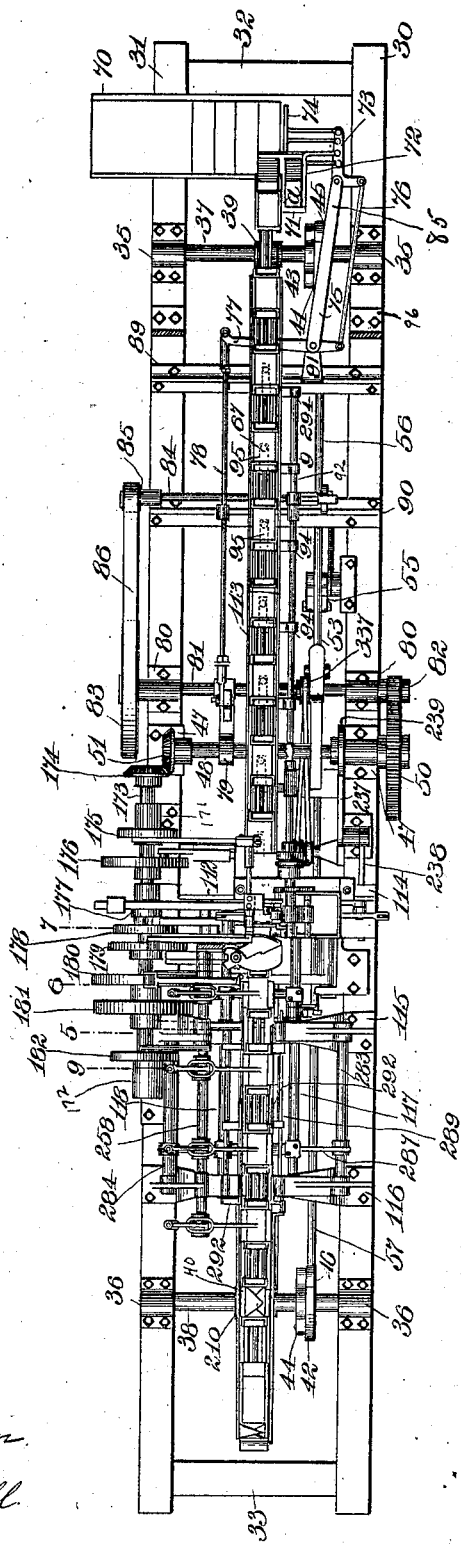
Figure 3:
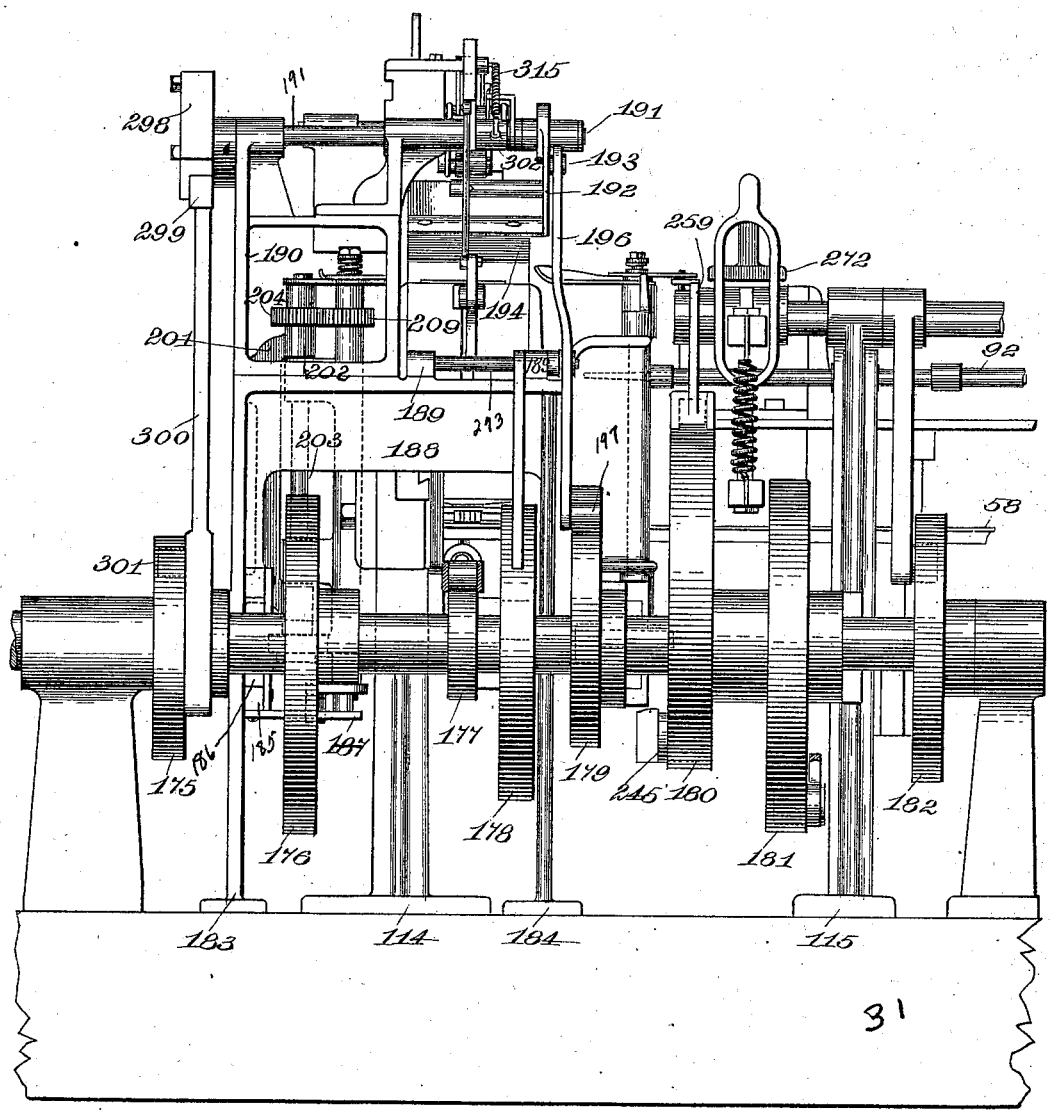
Figure 4:
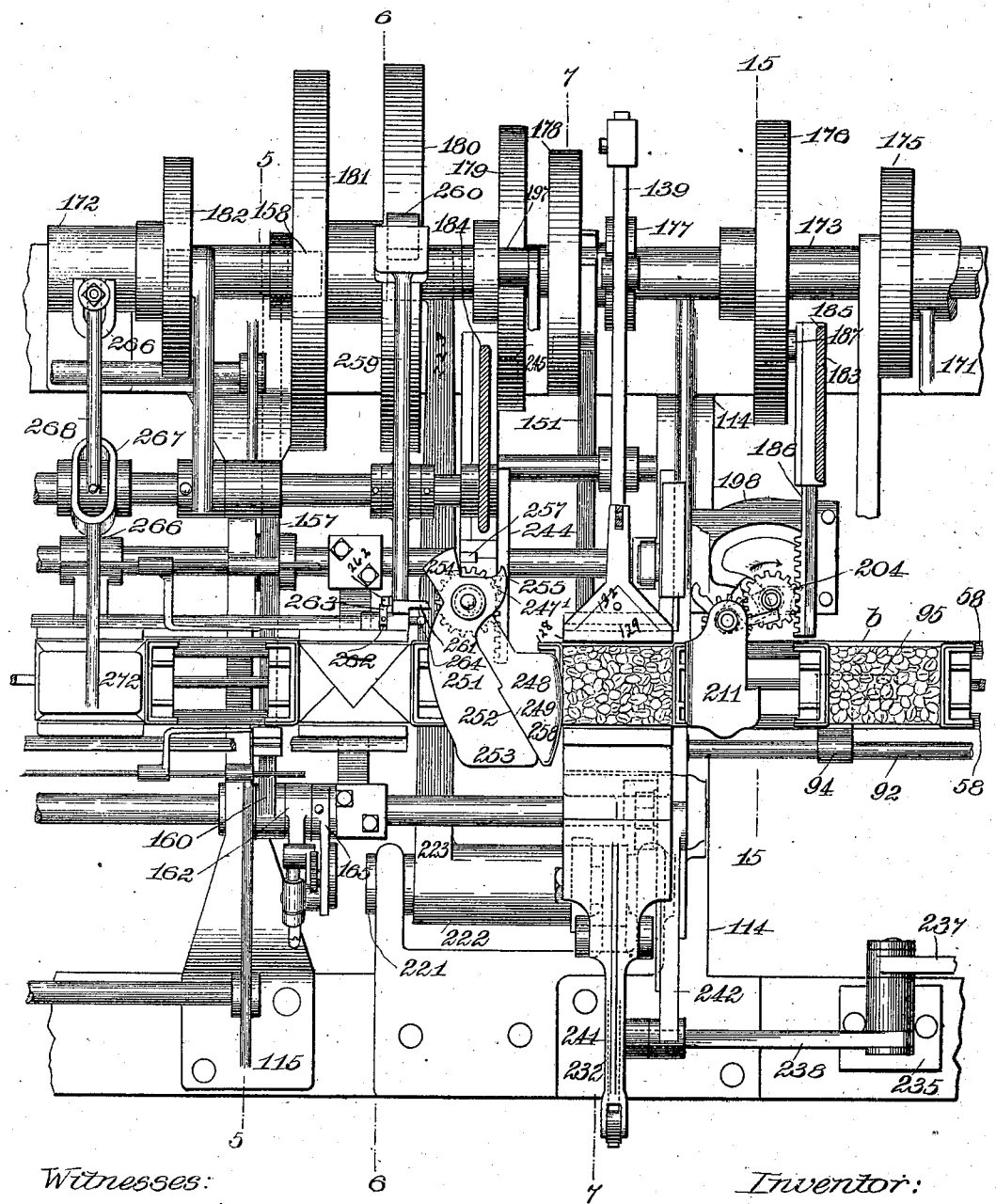
Figure 5:
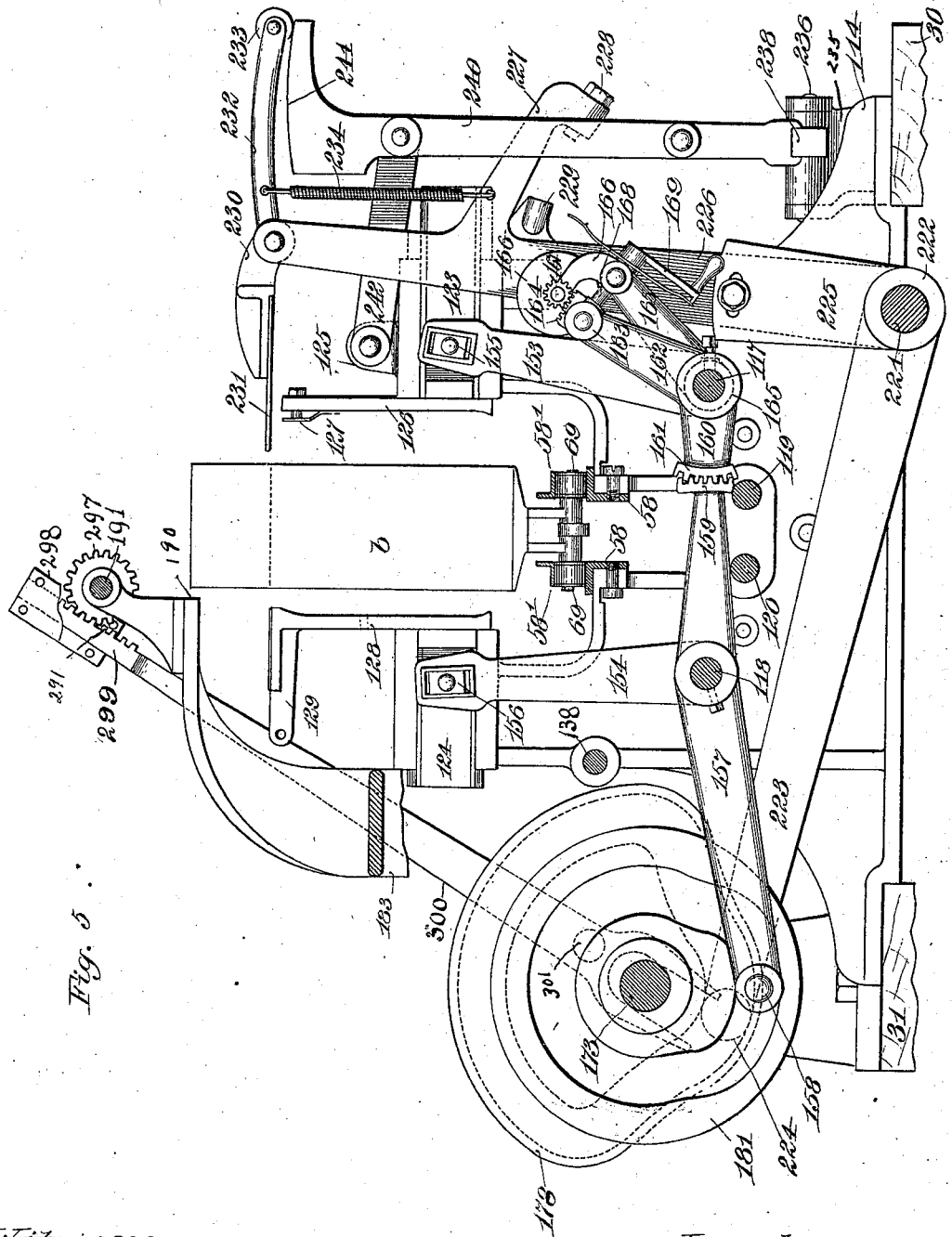
Figure 6:
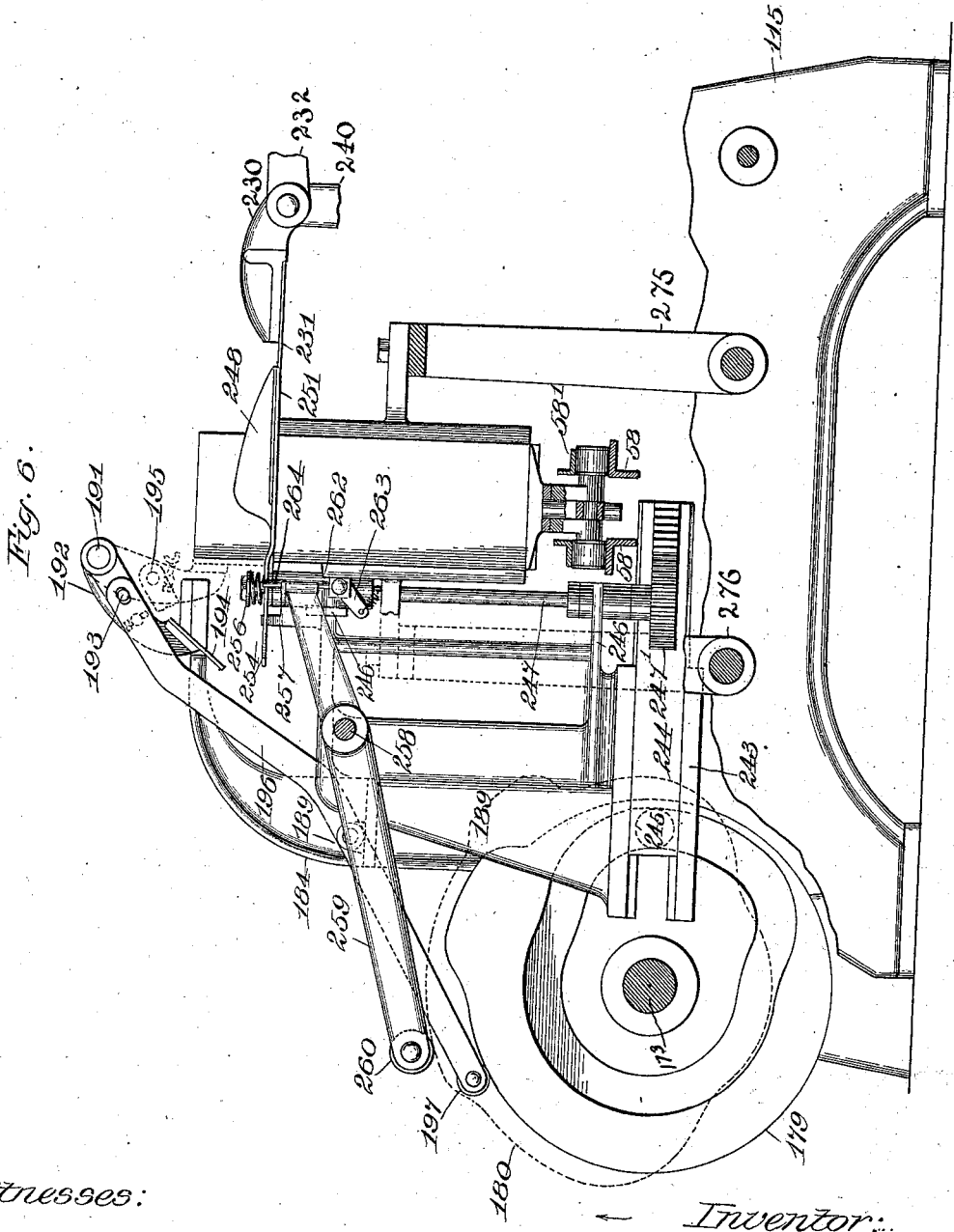
Figures 7, 8:
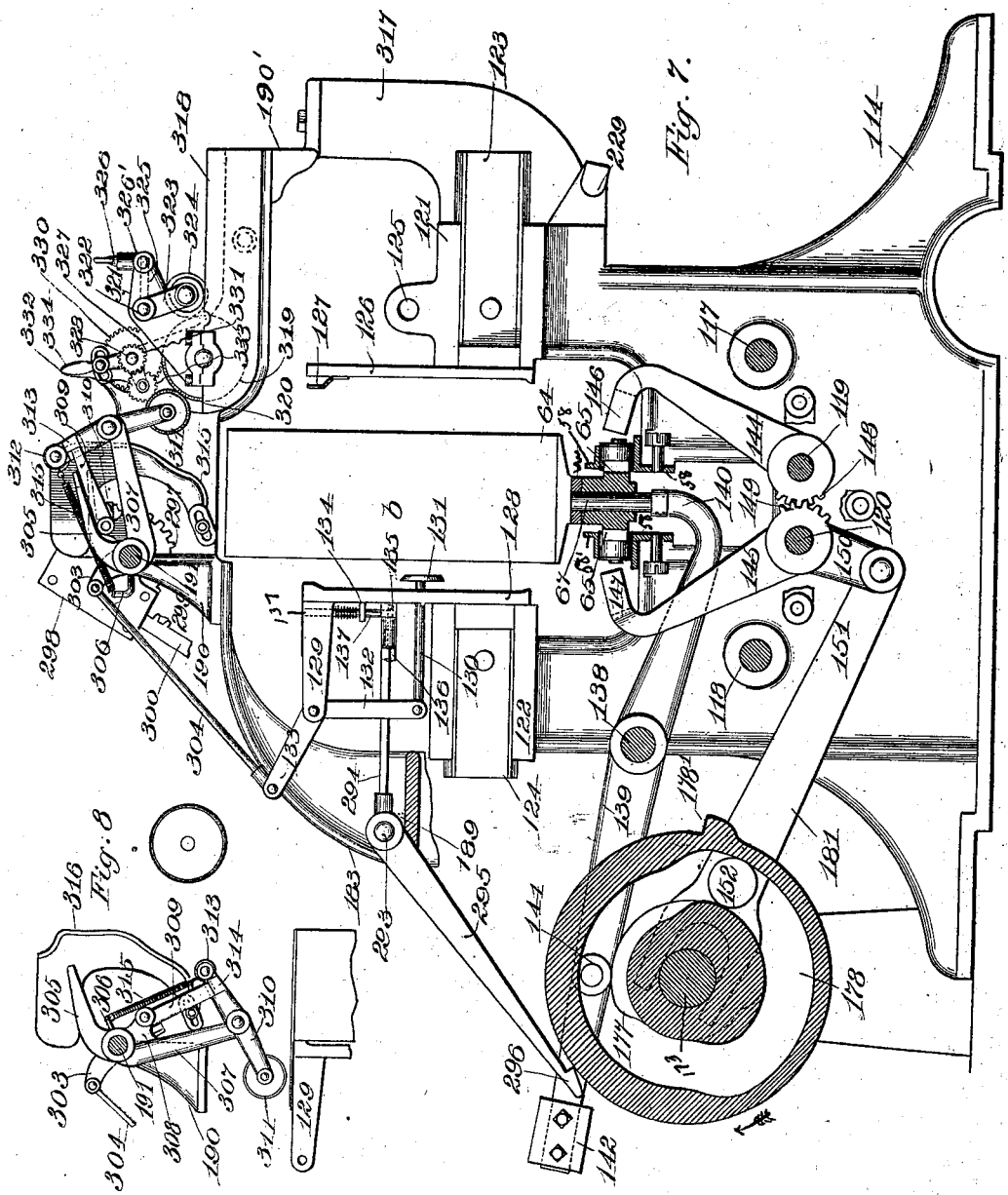
Figure 12:
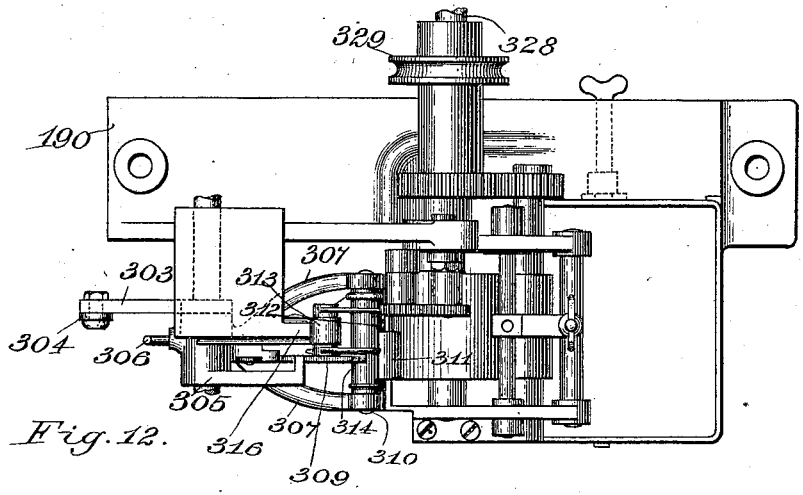
Figure 13:
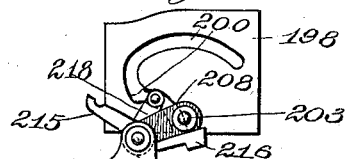
Figure 14:
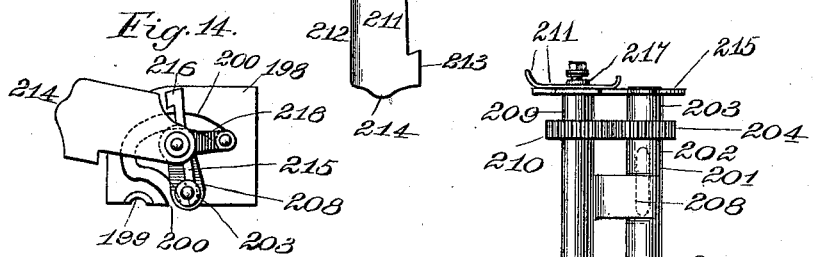
Figure 15:
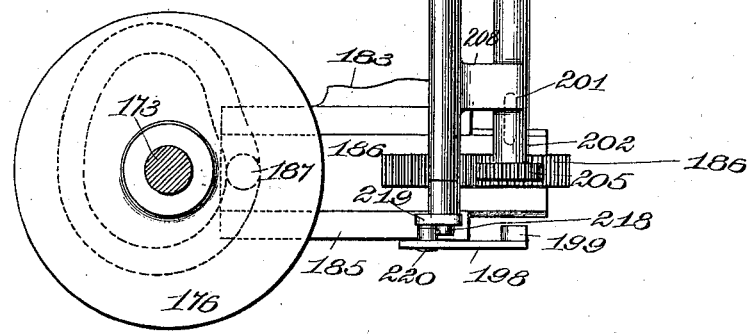

In the drawings, Figure 1 represents a front elevation of the improved packing-machine. Fig. 2 represents a plan view of the same. Fig. 3 represents a rear elevation, on enlarged scale, of the parts particularly relating to the top folding and gluing devices and of some of the parts in association therewith. Fig. 4 represents a plan view, also enlarged, of said folding mechanism and some of the adjacent parts. Fig. 5 represents a vertical cross-sectional view taken on line 5, Figs. 2 and 4. Fig. 6 represents a vertical cross-sectional view taken on line 6, Figs. 2 and 4. Fig. 7 represents a similar view taken on line 7, Figs. 2 and 4, and relating particularly to the positioning of the filled package and the gluing mechanism with its detector device. Fig. 8 represents details of the gluing mechanism, showing the glue-roll in the lowered position, but sustained out of contact with the parts of the folder devices, as when restrained by the non action of the glue-roll detecting device. Fig. 9 represents a vertical cross-sectional view of the machine, taken on line 9, Fig. 2, and illustrating one of the top and side pressure devices and its associated mechanism. Fig. 10 represents an enlarged front elevation of one of the carriers, showing details of the package-lifting devices. Fig. 11 represents an end elevation of the same, showing the holding-dogs for holding the carrier in position for the folding and gluing of the upper portion of the wrapper. Fig. 12 represents a plan view of the gluing mechanism. Fig. 13 represents a plan view showing details of the second folder-plate and its controlling means in the first or inactive position. Fig. 14 represents a similar view showing this plate in the position occupied thereby after its folding operation has been accomplished. Fig. 15 represents these parts in elevation and in association with their actuating-cam, the cam-shaft being shown in section, as on line 15, Fig. 4. Figs. 16 to 20, inclusive, represent diagrams of the filled package in the folding position with the various positions occupied by the folder-blades in accomplishing the folding and returning to their initial positions, also showing some of the features of construction. Fig. 16 represents the relations of the blades when the filled package is in the folding position. Fig. 17 represents the first fold as having been made, the first folder-blade remaining in position as completing said fold and the second folder-blade as finishing its folding movement. Fig. 18 represents the first folder-plate as still resting in its fold and the crease-plate of the third folder brought to position for creasing the last fold, the third folder-plate being swung backward beyond the triangular last fold ready for the forward movement to engage the last-folded portion when the end of such portion is raised above the edge of the last folder. Between the positions shown in Figs. 17 and 18 the glue is applied in a strip along the edge of the fold made by the second plate. Fig. 19 represents the retraction of the first folder-plate and the swinging forward of the last folder-plate, the first action of said plate being to force the triangular last fold over the edge of the creaser-plate and then subsequently to press this triangular portion down onto the top of the package as the creaser-plate moves away. Fig. 20 represents these parts in their relative positions as the folding is completed and slightly after the onward movement of package has commenced, showing the ironing action of the last folder-plate on the folded and glued top of the package. Fig. 21 represents a vertical cross-sectional view of the supply-hopper and its detector mechanism, whereby the absence of a wrapper in the carrier beneath said hopper is detected and the supply is diverted. Fig. 22 represents a vertical sectional view of the same, taken at right angles to Fig. 21.

Similar numerals of reference designate corresponding parts throughout.

In carrying this invention into practice I construct a strong and substantial frame in the nature of a supporting-base, preferably having the front and back members 30 and 31 and the cross-bars 32 and 33 and supported on the standards 34 34; but it is evident that any suitable base may be utilized and that it may be braced and otherwise strengthened in any usual manner.

Mounted on the members 30 and 31 at the respective ends of the frame are bearings 35 35 and 36 36, and in these bearings are journaled the shafts 37 and 38, each of which has a sprocket-wheel 39 and 40 and a ratchet 41 and 42, and on each of the shafts is pivotally mounted an arm 43 and 44, having a pawl 45 or 46, adapted to engage the teeth of its associated ratchet when the arm is swung and to thus cause the intermittent rotation of the shafts with their sprocket-wheels.

About midway in the length of the frame are mounted bearings 47 47, in which the main shaft 48 is journaled, and on this shaft is mounted the cam 49 and the gears 50 and 51. Working over the shaft is the frame 52, having the arm 53, provided at one end with the roller-bearing 54, working against the face of the cam 49, the other end of the arm 53 being pivoted to the lever 55, which is in turn pivoted on a stud projecting inwardly from the frame member 30, the lower end of this arm being connected with the pawl-arms 43 and 44 by the rods 56 and 57, pivoted to said lever and to the respective pawl-arms. Thus at each rotation of the shaft 48 the lever 55, being retracted by the spring 55', is vibrated, and through the rods 56 and 57 and their connections the ratchet 41 and 42, with the shafts 37 and 38 and their sprockets 39 and 40, are intermittently rotated.

Extending between the upper portions of the sprockets 39 and 40 are rails 58 58, suitably supported on brackets, as is shown in Figs. 5 and 7 of the drawings, and extending beneath the operative portions of the machine at a distance therefrom is the guard 59, having the curved ends 60 and 61.

Working over the sprocket-wheels 39 and 40 is an endless belt formed of a series of carriers, Figs. 10 and 11, connected and suitably distanced by the links 62 62, pivotally connected at the ends to the base portions of said carriers.

The carriers (shown in Figs. 10 and 11) are open at the front and back, having the bases 63, provided with the end pieces 64 64, extending upward a suitable distance, the open space between such end pieces being adapted to receive a package of a predetermined size. The bases of said carriers have openings, as 65, Fig. 10, formed at their sides, and in the bases are mounted the vertically-movable bottoms 66, having the pins 67 and being connected with their respective bases by the retracting-springs 68 68. On the pivots connecting the bases 63 with the links 62 are mounted wheels or rolls 69 69, which ride on the rails 58 58.

At the feeding and ejecting end of the machine is a receiver 70, by which the filled carriers travel. Slightly above the open end of this receiver is positioned a support 71, adapted to receive the empty wrapper $a$, and working over this support is the feeding-pusher 72, fixed on one arm of the bell-crank lever 73, to which arm the ejector 74 is also fixed. This bell-crank lever 73 is pivotally supported by means of a pivot mounted in the arm 75 and is intermittently operated by the connecting-rod 76 and the lever 77, suitably pivoted, and actuated by the rod 78, which is reciprocated by the action of the cam 79 on the shaft 48 at each forward movement of the carriers, so that an empty wrapper or container placed on the support 71 is pushed into the carrier opposite this support by the pusher 72 at the same time that a filled and sealed package is ejected by the ejector 74 from a carrier opposite the receiver 70.

Adjacent to the bearings 47 47 are mounted the bearings 80 80, in which is journaled the shaft 81, furnished with the small gear 82, meshing with the large gear 50, and provided at its other end portion with the belt-pulley 83. At a distance from this shaft 81 is journaled the shaft 84, furnished with the belt-pulley 85, considerably smaller in diameter than the pulley 83, the shaft 85 being driven at a high speed by the belt 86, working over the pulleys 83 and 85, and to the forward end of the shaft 81 is secured the crank 87, carrying the pivoted arm 88, the use of which will hereinafter be described.

On the members 30 and 31 are mounted the braces 89 and 90, portions of which extend upward to support parts of the machinery. The brace 89 has an extension 91, on which the arm 75 of the feeder and ejector mechanism is pivoted, and these braces are provided with bearings in which the rock-shaft 92 is journaled, this shaft having a laterally-extending arm 93, which is pivotally connected with the upper end of the arm 88 of the crank 87, so that when the shaft 84 is driven the shaft 92 is rapidly rocked to rapidly vibrate the shaker-arms 94 94, fixed to said shaft 92, the extensions 95 95 of which are positioned to act on the rod 95', on which the pins 65 of the carriers travel from the filling position nearly to the gluing position.

Secured to the frame members 30 and 31, between the bracket 89 and the bearings 35, is the frame 96, carrying at its upper portion the delivery-hopper. (Shown enlarged in Figs. 21 and 22.) This hopper comprises a casing 97, having the inlet 98, adapted to receive periodical supplies of a predetermined quantity, and the outlets 99 and 100, the outlet 99 being positioned or having an extension, preferably as shown at 101, to deliver material from the hopper to an empty wrapper brought beneath the same, and the outlet 100 being designed to deliver the material in a different direction from that of the outlet 99. Near the lower portion of the casing 97 is journaled the shaft 102, carrying the upwardly-extending flap-valve 103, closely fitting the interior of the casing to work therein. The outer ends of the shaft 102 are furnished with the balance-weights 104 and 105, the weight 105 having the arm 106, on which the weight 107 is adjustable. From the upper portion of the casing 97 extends the bracket-arm 108, and on the pivot of this arm is pivoted the detector 109, having the detector-frame 110 and connected with the balance-weight 105 by the retracting-spring 111. The frame 110 extends along one side of the path of the carriers 64, and spring 111 tends to draw the same across said path until brought to a position where the weight 107 is allowed to swing the shaft 102 to throw the valve 103 to the position shown in dotted lines in Fig. 21 to direct the material through the outlet 100.

The detector-frame 110 is normally held in the position shown in full lines in Fig. 21 by the upper portion of the wrapper a, and it will be noticed by reference to Fig. 1 of the drawings this frame is sufficiently long to span the distance between two of the carriers, so that it will not swing between the wrappers in adjacent carriers. By the use of this hopper and its detector the material is diverted from its movement toward the carrier therebeneath when no wrapper is present in said carrier to receive the material and is directed through the outlet 100 to any suitable container.

The standard 112 is secured to the frame member 30 in proximity to the bearing 47 thereof and extends upward, being provided with a bearing for the rock-shaft 92 and at its upper end with a bearing for the hand-shaft of the glue-roll, to be hereinafter described. Between this standard 112 and the frame 96 extend the guides 113 113 at the sides of the path in which the carriers travel.

Secured to the frame members 30 and 31 are the frames 114, 115, and 116, which are suitably spaced, and in perforations of these frames are journaled the shafts 117 and 118, while in the frames 114 and 115 are fixed the shafts 119 and 120, the frames 115 and 116 being of similar construction.

In the upper arm portions of the frame 114 are the guides 121 and 122, in which are movably mounted the slides 123 and 124, the guides 121 having the perforated ear 125. On the slide 123 is fixed the vertical side-pressure plate 126, furnished at its upper end with the spring projection 127, and the slide 124 is provided with the vertical side-pressure plate 128, having the bracket-shelf 129, a plan view of which is shown in Fig. 4. This plate 128 is perforated to receive the detector-rod 130, carrying the disk 131, the rear end of this rod being pivoted to the downwardly-extending arm 132 of the bell-crank 133, pivoted to the bracket-shelf 129. From the rear of the plate 128 also project the perforated projection 134 and the arm 135. On this arm is pivoted the tripper-plate 136, supporting on one end the spring-depressed pin 137, which works through the perforation in the projection 134 and through a corresponding perforation in the bracket-shelf 129. From the frame 114 also projects the stud-shaft 138, and on this shaft is mounted to swing the lever 139, having the inner end 140 positioned to act on the pin 67 of the carrier when said carrier is brought to the gluing or sealing position, the outer end portions of this lever being furnished with the projecting sleeve-bearing 141 and the adjustable balance-weight 142.

On the shaft 119 and 120 are respectively mounted the dogs 144 and 145, having inwardly-turned ends 146 and 147, adapted to engage in the recesses 65 of the carrier-bases when the carriers are brought to the gluing position. The bosses of these dogs are supplied with gear-teeth 148 and 149, which intermesh, and the boss of the dog 145 has the projection 150 working on a pivot which extends from the lever 151, this lever having a forked end which engages over the cam-shaft and a projecting bearing-stud 152.

Fixed on the shafts 117 and 118 are the arms 153 and 154, having slotted upper ends in which the slide-blocks 155 and 156, Fig. 5, work, these blocks being engaged with the pins projecting from the respective slides 123 and 124 to reciprocate the slides, and thus bring pressure on the sides of the package located therebetween by means of the plates 126 and 128 when said shafts are rotated.

The rotation of the shafts 117 and 118 is effected by means of the lever 157, fixed on said shaft and having its outer end provided with a bearing-stud 158 and at its inner end the segmental gear 159. On the shaft 117 is journaled the arm 160, having the segmental gear 161, which meshes with the gear 159, and the member 162, on the upper end of which is pivoted the socket-piece 163, having a screw-threaded socket and the rack 164. Fixed on the shaft 117 is the arm 165, having pivoted to its upper end the fitting 166, having a pivot on which the dial-pinion 167 works to engage the rack 164. This fitting is also furnished with a transverse perforation in which the shaft 168 works, the screw-threaded end of the shaft engaging in the threaded socket of the socket-piece 163 and being adapted to be rotated by the crank-arm 169 and its handle to adjust the separation of the upper ends of the members 162 and 165 and to thus determine the point of engagement between the segmental-gear portions 159 and 161, and thus the swing of the arm 160, to thereby regulate the movement of the slide 123.

Mounted on the frame member 31 are the bearings 171 and 172, and in these bearings is journaled the cam-shaft 173, provided with the bevel-gear 174, which meshes with and is driven by the complemental gear 51 on the main shaft 48. Fixed on the cam-shaft are the cams 175, 176, 177, 178, 179, 180, 181, and 182, the cam 178 having the projection 178′ (see Fig. 7) on its periphery.

The cam 177 works against the bearing 141 of the lever 139 and is proportioned to permit the depression of the weighted end of said lever at the time when the pin 67 of a carrier is brought directly above the end 140 of this lever, thus elevating the end 140 and lifting the pin 67 and the bottom 66 of the carrier and the package thereon to bring the level of the material in the package up to a position for folding. At the same time the cam 178 directs the movement of the stud 152, working therein, to draw the arm 151 and to actuate the arm 150 to close the dogs 144 and 145 and engage the ends 146 and 147 in the recesses 65 of the carrier-base to hold the carrier from movement.

Immediately after the locking of the carrier by the dogs 144 and 145 the cam 181 reaches a position in relation to the stud 158 of the lever 157 to elevate this end of the lever, and thus rotate the shafts 118 and 117 through the connections therewith and to cause the inward swinging of the arms 153 and 154 to carry the slides 123 and 124, with their presser-plates 126 and 128, toward the package.

At one side of the cam 176 is secured to the member 31 the standard 183, forming, with the standard 184, the support for the gluing mechanism. The standard 183 has the guide 185, in which the rack-slide 186 is movable, a bearing 187 (see Fig. 4) working in the path of the cam 176 to reciprocate this slide at times. The upper portions of said standard are connected by the cross-piece 188, having the bearings 189 189, and above this cross-piece is the frame 190, carrying the shaft 191. On one end portion of this shaft 191 is pivoted the arm 192, having the arm 193 and the plate 194, and on the frame adjacent to the path of the arm 192 is mounted the adjustable stop 195 for limiting the forward movement of said arm, the lever 196 being pivoted on a stud which projects from the standard 184 and being engaged at its upper end with the pin 193 of the arm, while its lower end is provided with the roll 197, bearing on the periphery of the cam 179, whereby at times the arm 192 is swung to bring the plate 194 against the rear upper portion of the filled package.

Secured to the frame 114 and sustained in part by a portion of the bracket 183 is the cam-plate 198 of the second folder-plate mechanism. (Shown in Figs. 13 and 14.) At the forward edge of this plate at one side is formed the open bearing or stop 199, and from this forward edge opens the cam-slot 200, the primary curve of which from the opening being practically concentric with the curve of the bearing 199 and the slot then curving eccentrically to the axis of said bearing first slightly toward said bearing and then away from the same, as shown.

From the standard 183 extends the bracket 201, having vertically-perforated bearings 202 202. In these bearings is journaled the shaft 203, having at its upper end portion the gear 204 and at its lower end the gear 205, which latter gear meshes with the teeth of the slide-rack 186. On the shaft 203 is pivoted the bearing-sleeve 206, which is connected to the bearing-sleeve 207 by the arms 208 208, and in the sleeve 207 is journaled the shaft 209, having the gear 210, meshing with the gear 204 and carrying the second folder-plate 211, having the upwardly-curved edges 212 and 213, between which at the free end of the plate is the creasing-lip 214, the edge 213 being short, as the portion of the material toward the pivoted part of the blade is cut away to provide clearance. Immediately below said plate are the stop-arms 215 and 216, which are connected by the spring 217 with the shaft 209. The lower end of the shaft 209 is finished with the hub 218, adapted at times to be rotatably located in the bearing 199, and from this hub extends laterally the arm 219, having the projection 220.

When in the position shown in Figs. 4 and 18, the plate 211 is ready to start its folding movement, the hub 218 being in the bearing 199. The backward movement of the rack 186 from this point through the action of the cam 176 causes the rotation of the gear 205 with its shaft 203 and the gear 204 in the direction of the arrow in Fig. 4, thus rotating the gear 210 and its shaft 207, with the blade 211, until the blade is brought to the position slightly beyond that shown in Fig. 17, the projection 220 in the meantime swinging through the concentric portion of the cam-slot 200 and out of the open end thereof. The rack 186 having at this time reached the limit of its backward movement is now driven forward and causes the reverse rotation of the gear 205 and its related rotative mechanism, thus swinging the blade forward and bringing the projection 220 through the concentric portion of the slot 200 to the forward curve of said slot. If the blade 211 be left in this position, Fig. 13, it will interrupt the next approaching unsealed package. The forward movement of the rack 186 is therefore continued, as is also the rotation of the gears 205, 204, and 210. The projection 220, working through the forward curve of the slot 200 and its arm 219, first pushes the hub 218 from the open bearing 199 and then entering the long backward curve of the slot 200 carries the shaft 207 and its related mechanism backward until said projection has traversed nearly the length of this portion of the slot until the forward movement of the rack has ceased. By this mechanical movement the blade 211 is drawn from between the carriers to a position where it cannot interfere with the next approaching package. At the initial rearward movement of the rack 186 the motion just described is reversed. When the projection 220 enters the forward bend of the cam-slot, it swings the hub 218 around the projecting portion of the open bearing 199 and then draws the same into that bearing ready for rotation. At the limits of rotation of the shaft 209 the stops 215 and 216 alternately bear against the shaft 203, the stop 215 yielding slightly against the action of its spring 217.

Extending from the frame 114 is the stud 221, on which is journaled the sleeve 222, having the rearwardly-extending lever 223, the bearing-stud 224 of which is engaged in the cam-path of the cam 180, as shown in Fig. 5, and the upwardly-projecting member 225, and to this member is adjustably secured the first folder-plate lever 226, having the stop member 227, in which the stop 228 is screwed, the stop 228 being adapted to be intercepted by the buffer 229, secured to the frame 114. At the upper portion of the lever 226 is pivoted the arm 230, provided with the first folder-plate 231 of a size and shape proportioned to the size and shape of the package under operation, as shown in Figs. 16 to 20, this arm 230 having the member 232 furnished with the roller-bearing 233 and connected by the tension-spring 234 with the stop member 227, the strain exerted by said spring tending continually to swing the free end of the folder-plate 231 upward.

On the frame 30 is secured the bearing 235, in which is pivoted the shaft 236, having the arms 237 and 238. The arm 237 bears against the cam 239 on the main shaft 48 and is depressed at times by said cam. On the arm 238 is supported the standard 240, having at its upper end the cam-path 241 and connected by the link 242 with the ear 125 of the frame 114, the link being pivoted at its ends to said parts to permit the elevation of the standard 240 at times. Under the action of the downward motion of the movable end of the lever 223 the arm 226 swings inward, the generally horizontal position of the plate 231 being maintained by the bearing 233 of the controller-arm 232, working over the cam-path 241, until the arm 238 is raised by the action of the cam 239 on the arm 237, when the free end of the plate 231 will be depressed, this occurring as the limit of inward movement of the plate is reached, the arm 238 being again depressed to permit the retraction of the plate 231 in a horizontal path.

On the lower portion of the standard 184 is the guide 243, in which the rack-slide 244 is movable, the stud 245 of the rack-slide engaging in the cam-path formed in the face of the cam 179. From the standard 184, above the guide 243, extend the arms 246 246, in bearings of which the shaft 247, having the gear 247′, is journaled, and at the upper portion of this shaft is fixed the third or last folder-plate 248, having the upwardly-curled straight front edge 249 and the curling and curved rear edge 250. Also mounted on this shaft 247 is the crease-plate 251, having the straight beveled edge 252 and the end 253 at one side of said shaft and the stop-lips 254 and 255 at the other side of the shaft. This latter plate is journaled on the shaft and is normally held in position by the coiled spring 256, secured to said plate and to the shaft. From the standard 184 extends the stop 257, which at times is adapted to intercept the stop 255 of this plate 251.

Pivoted on the shaft 258, which projects from a portion of the standard 184, is the lever 259, provided with the roller-bearing 260, which rides on the periphery of the cam 180. At its forward end this lever has the stop 261 and the tripper-finger 262. (Shown in Fig. 4.)

On the forward extension 246 of the standard 184 is pivoted the arm 263, having stop-pin 264, the arm 263 being depressible when struck by the finger 262 as the rear end of the lever 259 is elevated by the cam 180 and the swinging of the stop-pin 264 being limited by the stop 261 on said lever, the office of the stop-pin 264 being to strike the stop 254 of the crease-blade 251 and to force said stop 254 along to retract the edge 252 until said pin 264 is intercepted by the stop 261.

Journaled in the upper rear portion of the frames 115 and 116 is the shaft 265, carrying a series of presser-arms 266 266, mounted to swing thereon and disposed with relation to the positions of the carriers when at rest. These presser-arms have each a yoke 267, through which extends an arm 268, fixed to said shaft 265 and having a depending stop 269, the rear end of each arm 268 being connected with the lower end of its related presser-arm by a retraction-spring 270. Each presser-arm is also furnished with a stop 271, corresponding to the stop 269 of the related arm 268, and at its forward end is curved over the path of the carriers and is provided with a more or less elastic cushion 272. On the shaft is fixed the arm 273, which extends downward and has a stud 274, which engages with a cam-path of the cam 182, this cam-path being shaped to at times cause the elevation and depression of the free end of the arm 273, thus raising and lowering the outer ends of the arms 268 and drawing the rear ends of the presser-arms 266 upward by means of the spring connections to press the cushions down on the recently-sealed ends of the package c c, the lifting of the presser ends of the arms 266 being effected by the weight and leverage of those portions extending rearwardly from the shaft 265.

Fixed on those portions of each of the shafts 117 and 118, which extend beyond the frame 115, is a series of upwardly-extending arms, as 275 and 276, Fig. 9, the respective series at each side of the carrier-path being connected by a longitudinal member 277 or 278, and on these members are mounted the shanks 279 or 280 of the respective front presser-plates 281 and the back presser-plates 282, positioned to be pressed against the corresponding portions of the packages when the carriers are at rest. At the lower portions of the frame 115 and 116 are fixed the shafts 283 and 284, carrying the freely-swinging arms 285 and 286, the upper ends of which are connected with the similar portions of the arms 275 and 276 by the rigid links 287 and 288, pivoted to their respective arms.

The upper portions of the frames 115 and 116 are furnished with the inwardly-extending portions 289 and 290, on which are mounted the guides 292 292, between which the carriers move and which prevent the falling of the packages from the carrier.

The upper rails 58' 58' extend through that portion of the machine where the folding and sealing of the packages is effected, being supported by brackets extending from the rails 58 58 or in any other suitable manner. The office of these upper rails is to prevent the rising of the carriers while the package is under operation or during the lifting of the package by the arm 139 preliminary to the sealing operation.

Now returning to that part of the machine opposite to the location of the package at the time of sealing and folding it will be seen that in the ears 189 189 of the cross-frame 188, Fig. 3, is journaled the shaft 293, having the fixed arm 294, the free end of which rests on the end of the pivoted tripper-plate 136, and the fixed cam-arm 295, the projection 296 of which rides on the periphery of the cam 178 and is elevated at times by the shoulder 178' and almost immediately permitted to drop as the straight face of the shoulder 178' is brought in line with the clearance of the projection 296 of said arm, the office of these arms 294 and 295 being to elevate the pin 137 to lift the rearwardly-extending flap of the package-wrapper when the third folder-plate has swung back and is about to move forward to permit the front edge of the folder-plate to engage under said flap, as will hereinafter be described, the pin 135 being then retracted by its spring to avoid the interception of the third folder-plate as it moves forward.

The shaft 191, as stated above, is journaled in bearings of the frame 190. At one end of this shaft is fixed the gear 297, over a portion of which extends the guide-frame 298, and in the guide-frame is movably mounted the rack 299, in engagement with the teeth of the gear 297, the arm 300 forming an extension of such rack and being provided with a stud 301, working in the path of the cam 175.

On the shaft 191 is journaled the sleeve 302, Fig. 7, having the arm 303, pivotally connected with the crank-lever 133 by the rod 304 and the tripper 305, the spring-support extending rearwardly from said sleeve.

Fixed on the shaft 191 are the arms, as 307, having the projection 308, to which the latch 309 is pivoted, and on the arms 307 is pivoted the glue-delivery roll-frame 310, furnished with the glue-delivery roll 311, with its gear 312, Fig. 12, at its lower end and at its upper end with the roller-bearing 313 and the catch 314, with which the end of the latch 305 is adapted to be engaged, the upper end of the glue-roll frame being connected by the spring 315 with the pin 306, which spring tends to draw this end of the glue-roll frame inward to bear against the face of the cam 316, adjustably secured to the frame 190 and suitably shaped for the direction of the glue-roll 311 when the bearing 313 rides thereon.

One portion, 190', of the frame 190 (shown in Fig. 7) extends over that portion of the machine at which the package is sealed, being supported at its forward end by the bracket 317, which is secured to the frame 114. On the front portion of the frame member 190' is secured the glue-reservoir 318, preferably removable therefrom, this reservoir being furnished with the glue-supply roll 319, rotatable in bearings and having a gear 320. The reservoir is also provided with side plates 321, in which the shaft 322 works, and on the ends of the shaft are fixed the arms 323, between the ends of which is journaled the shaft on which the glue-distributing roll 324 is journaled. Also fixed to the shaft 322 is the spring stop-arm 325, extending laterally therefrom to rest under the adjusting-screw 326 of the cross-bar 326', mounted on the side plates 321 of the reservoir, by the adjustment of which the pressure of the roll 324 on the supply-roll 319 is effected. The member 190' of the frame 190 is also provided with the bearing-brackets, as 327, Fig. 7, and in these brackets is journaled the glue-drive shaft 328, having the belt-pulley 329 and the gears 330 and 331. On this shaft is journaled the arm 332, on a stud at the outer end of which is rotatable the idle pinion 333, intermeshing with the gear 331. A handle 334 is fixed to said arm, by means of which the arm may be swung about the shaft 328, provision being made to adjustably secure this handle to some fixed part of the machine, this adjustment being desirable in order to so position the pinion 333 that it may be engaged by the gear of the glue-delivery roll 311 as the latter swings into contact more or less with the supply-roll 319 and to permit of such approach, the glue-delivery roll being thus rotated while taking a supply of glue from the roll 219, the engagement of the gear 330 with the gear 320 of the supply-roll at the same time driving the supply-roll in the same direction, but preferably at a different speed. The glue-roll shaft 328 is driven by the belt 335, Fig. 1, working over said pulley, under the guide-pulley 37, rotatably mounted in the bracket 336 of the member 30, and around the pulley 337, secured to the shaft 81, which shaft is driven by the engagement of its gear 82 with the gear 50.

Mechanism of any well-known construction being associated with the hopper 97 to deliver thereto periodically granular or other comparatively loose material in predetermined quantities, the operation of the machine is as follows: Wrappers $a\,a$ are placed one at a time on the surface of the support 7 at each outward movement of the feeder 72 and between said support and the path of the carriers and are by this feeder pushed into the carrier which is at rest beside said support at that time. These wrappers are shaped in cross-section to be received by the carriers, as is in Fig. 16 of the drawings, and have longitudinal dimensions considerably greater than the height of the ends 64 of the carriers, the bottoms of the wrappers being closed. The intermittent driving forward of the carriers by means of the connections between the drive-shaft 48 and the sprockets 39 and 40 brings the carriers in succession beneath the spout or fitting 101 of the hopper 97, and the predetermined amount of material simultaneously delivered to said hopper is directed into the open end of the wrapper $a$ to fill it to a level slightly above the upper ends of the carrier when such wrapper is present in the carrier therebeneath at the time such material passes through the hopper, this direction of the material being effected by that portion of the wrapper extending above the carrier bearing against the detector-arm 110 and holding it in the position shown in full lines in Fig. 21 of the drawings. When no wrapper is present in the carrier beneath the hopper 97, the detector-arm 110 is permitted to swing to the position shown in dotted lines in Fig. 21 of the drawings, and the flap-valve 103 is brought to the position (also shown in dotted lines in said figure) to direct the material through the outlet 100 into a suitable receiver. As the carriers are successively brought beneath the supply-hopper they enter between the guides 113 113, which prevent undue lateral movement of the filled wrapper $b$. At the same time the pins 67 successively ride onto the upper surface of the shaker plate or member 95', which being constantly and rapidly vibrated by the action of the crank 87 and the connections between the same and this member causes the rapid reciprocation of the pins and the raising of the bottoms 66 of the carriers, the springs 68 68 tending to draw these bottoms 66 downward. It will therefore be seen that the material entering the wrapper is shaken and compacted as it enters the wrapper and in comparatively small quantities, continually increasing, thus effecting a close packing of the contents. This shaking is carried on continuously after the delivery of the material until the filled package nears the folding and sealing position; but it is evident that this invention is not intended to be limited to the particular point at which the shaking commences or ceases. At times it becomes important to exert lateral pressure on the exposed sides of the filled wrapper to crowd the material therein upward, and one of the positions in the progressive operation where this pressure is particularly desirable is at the time of sealing. In view of the varying cubical dimensions of various material of the same weight and the similar variation in different grades or lots of the same material, such as coffee, it is essential that these pressure-exerting devices should be readily adjustable. After the filling of the wrapper and the shaking of the contents the carrier reaches the position for folding down the surplus material of the wrapper to form a top and to glue or seal the same. As the carrier with the filled but open wrapper $b$ enters the sealing position the open sides of the carrier are brought between the plates 126 and 128, Fig. 5 of the drawings. At or about the same time the rolls 69 69 of the carrier-base ride under the upper rails 58' 58'. Thus the lifting of the carrier is prevented, the recesses 65 65 are brought opposite the dogs 146 and 147, and the pin 67 of the carrier-base is positioned above the lifter end 140 of the lever 139. The arms 144 and 145 are now operated by their connections with the cam 178 to engage their dogs 146 and 147 in the recesses 65 of the carriage-base to prevent the longitudinal movement. About the same time the cam 177 has rotated to a position where the weighted end of the lever 139 is permitted to move downward, thus elevating the end 140 of the lever, and with it the pin 67 of the carrier, with the platform 66 and the filled wrapper $b$ thereon, to bring the level of the material therein to a suitable height for receiving the folded portions of the upper end of the wrapper. As the filled wrapper is raised to the sealing position the side-pressure plates are moved inward under the action of the arms 153 and 154 and their driving mechanism until the desired pressure is brought on the front and back of the filled wrapper, the pressure being determined by the adjustment of the arms 162 and 165 by means of the handle 169 and its shaft, whereby the point of engagement between the toothed ends 159 and 161 of the arms 157 and 160 is adjusted to determine the rotation of the shafts 117 and 118, and thus the swing of the arms 153 and 154. When the plate 128 moves inward to press against the rear side of the filled wrapper $b$, the forward movement of the detector 131 is limited by the wrapper, while the plate 128 moves into contact with said wrapper. This effects the swinging of the arms 132 and 133, fixed to their pivot, forcing the rod 304 and the free end of the arm 303 upward to rotate the sleeve 302 and press the tripper 305 against the latch 309 and move said latch from its engagement with the catch 314 to permit the spring to act to draw the roll 312 against the guiding-face of the cam 315. By this time the cam 178 has been rotated to the position shown in Fig. 5 of the drawings, where the stud end of the lever 223 is depressed, thereby throwing forward the member 225 and the arm 226 to force the edge of the first folder-plate carried by the lever 230 inward against the front portion of the wrapper and to fold the same inward. About this time the reinforce-plate 194 is moved into position against the back of the wrapper, as shown in dotted lines in Fig. 6 of the drawings, to reinforce this portion of the wrapper against the action of the first folder-plate. Slightly after the starting inward of the first folder-plate the arm 238 is raised by the depression of the arms 237 under the action of the cam 239, thus elevating the standard 240, with its cam-face 241, over which the bearing 233 of the folder-plate arm works, this causing the elevation of the bearing 233 and the consequent gradual directing downward of the edge of the folder-blade as it approaches the end of its throw and effecting the crowding downward and turning inward of the front and portions of the sides of the wrapper above the contents thereof. The cams 178 and 239 are so proportioned to now permit a dwell of the first folder-blade until a further point in the operation has been accomplished, and at this time the reinforce-plate 194 is moved upward. During this dwell the second folder-plate 211 is swung, as above described, from the position shown in Fig. 16 of the drawings over the package, the edge 212 smoothing down this side portion thereof until the drawing action of that side portion and the bending backward of the rear portion onto the support 129 effects the drawing down of the last side, as is shown in Fig. 17 of the drawings, and the lip 214 of this folder-blade working beneath the edge portion $g$ of this last fold and creasing the angular fold of the last turned-down portion as said lip leaves the triangular flap. Under the movement of the rack 244 the gear 247' and its shaft 247 are rotated at this time to swing the plates 248 and 251 backward over the end of the package, the edge 250 of the plate 248 smoothing the surface of the folds and pressing the triangular flap down onto the support 129. The plate 251 swings in this direction until its creasing edge 252 is brought nearly to the surface plane of the rear surface of the package, when the further movement of this plate is prevented by the fixed stop 257 intercepting the stop-arm 255 of said plate, and this plate then rests in the position shown in Fig. 18 of the drawings, while the plate 248 moves to the end of its throw and partially returns. Immediately prior to the return of the plate 248 the projection 178' of the cam 178 reaches a position in relation to the end 296 of the arm 295 to raise this end of the arm and to quickly drop the same. The arm 294 is thus caused to swing on its shaft and to depress the end of the tripper-plate 136 to throw the pin 137 upward against the retraction of its spring. By this means the triangular flap is raised from the support 129, so that the edge 249 of the plate 248 engages under said flap, while the spring of the pin 137 retracts said pin from the path of this blade. The return movement of the blade 248 folds the flap over the edge 252 of the blade 251 sufficiently to form a bend at the juncture of the flap with the main portion of the wrapper. At or about the time the extension 255 of the plate 248 is intercepted by the stop 257 the downward movement of the glue-roll to apply glue in a strip along the portion of the triangular flap indicated in dotted lines in Fig. 18 of the drawings commences, the direction of the glue-roll 311 being controlled by the bearing-roll 313, working over the irregular face of the cam 316 under the tension of the spring 315, while the glue-frame is carried down and returned by the swinging of the arms 307. In order that the glued strip of the triangular flap may be folded down onto the first inward fold of the wrapper, it is now necessary to withdraw the first folder-plate 231 and the crease-plate 251 from interference with such contact, this removal also being essential to prevent the application of glue from the triangular flap to the crease-plate. The initial return movement of the crease-plate is illustrated in Figs. 18 to 20, inclusive, of the drawings and is effected by the actuation of the pin 264 when the tripper 262 of the lever 259 strikes the pivoted arm 263, to which the pivot of said pin is secured, and the movement of this pin being limited by the stop 261 on said lever. The pin 264 acts on the extension 254 of the crease-plate when said plate rests in the position shown in Fig. 18 of the drawings and causes the swinging of the plate to the partially-retracted position (shown in Fig. 19) against the action of the spring 256. Approximately at the time this partial retraction of the crease-plate is taking place the return movement of the first folder-plate commences, and attention is here directed to the relative positions occupied by the plates, as illustrated in Figs. 17 and 18 of the drawings. In such figures it will be noticed that the plate 251 laps over the first folder-plate 231 and that the inturned side flaps of the wrapper are pressed down onto the upper surface of the plate 231 by the plate 251, the plate 231 pressing the first inturned portion of the wrapper on the upper surface of the contents. A downward movement of the first folder-plate in its withdrawal would bring undue end pressure on the contents of the package, while an upward movement of such plate is prevented by the overlapping crease-plate. It will therefore be seen that by the use of the cam 241, mounted on the vertically-movable standard 240, the action of the controller-bearing 233 may be such that the plate 231 can be withdrawn from the position shown in Fig. 18 of the drawings without deflection from the planes of its upper surfaces. As the crease-plate 251 and the first folder-plate 231 are retracted the third folder-plate 248 continues its return movement under the action of its shaft 263 and having engaged the lower surface of the triangular flap, as above described, turns the glued portion of this flap down onto the exposed surfaces of the previously-formed flaps and smooths the same down. On reaching the position shown in Fig. 20 the edge of this plate 248 engages the edge of the crease-plate and swings said plate to the position shown in Fig. 16. During this latter movement of the plates 248 and 251 the first folder-plate 211 has moved approximately to the position shown in Fig. 20 of the drawings, the dogs 146 and 147 have been released from engagement with the carrier, and the end 140 of the lever 139 has been depressed, dropping the pin 67 and the carrier-bottom to move the package downward, the pressure-plates 126 and 128 being retracted slightly prior to such dropping, and the chain of carriers is carried along, bringing the sealed end of the package c again under the smoothing action of the plate 248, while the next carrier is advanced to the sealing position. Should an empty carrier be brought into the sealing position, the detector 131 meets with no resistance in its forward movement, and no action of the tripper 305 takes place to trip the latch 309. Hence the drawing inward of the spring 315 of the bearing 312 is prevented by the latch 309 remaining in engagement with the catch 313. The arms 307 will then swing the glue-roll frame and move the glue-roll in an arc above the folder-plates, whereby the application of glue to said plates is prevented. From the sealing position the sealed packages c c are carried forward by the intermittent driving devices to the positions where side pressure is brought against them by the pressure-plates 281 and 282, while the springs 270 are permitted to act to depress the ends 272 of the levers 266 into contact with the sealed ends of the packages to provide intermittent pressure thereon while the glue is setting. Any desired number of these side and end pressure devices may of course be used. The packages are finally carried around the sprocket-wheel 40, being held in the carriers by frictional contact and by the guard 59, this guard effecting a further smoothing of the sealed ends of the packages, and the packages being returned to the starting end of the machine are automatically ejected from the carriers by the ejector 74.

The term "packing-machine" is herein used to designate a machine by the operation of which material may be packed in wrappers, cartons, or other containers which have been previously constructed in so far as they are prepared to receive the material as one of the steps in the operation of the machine.

It is evident that wrappers of different sizes within certain limits may be used in this machine, this being particularly noticeable in the difference in the cross-sectional dimensions to accommodate materials of different specific gravities without change in the height of the package, this being one of the essential reasons for the adjustment of the side-pressure plates whereby this pressure is proportioned to the cross-sectional dimensions of the package.

Having thus described my invention, I claim as new and desire to secure by Letters Patent—

1. A packing-machine comprising a wrapper-carrier having a base, a pin working through said base, a wrapper-support mounted on the pin, and retracting-springs connecting said support with the carrier.

2. A packing-machine comprising a non-vibratory wrapper-carrier, a shaker member movably mounted therein, means for feeding material to the wrapper in said carrier, and mechanism for rapidly moving the shaker member during such feeding operation.

3. A packing-machine comprising a wrapper-carrier having a base furnished with a vertical perforation and with side recesses adapted to receive locking means, a pin working in said perforation, a wrapper-support mounted on the pin, and springs connecting the support with the base.

4. A packing-machine comprising a series of wrapper-carriers mounted for intermittent movement, means for moving the same, a feeding-hopper positioned above the carriers and having an inlet, a delivery-opening and a by-path, a shaft journaled in the sides of the hopper and having counterweights at its ends, a valve fixed to said shaft within the hopper, a detector-arm pivotally mounted and having a lower guard, and a spring connecting the detector-arm with one of said counterweights.

5. A packing-machine comprising a series of wrapper-carriers mounted for movement, a shaker mechanism in each carrier having an extension working through the bottoms thereof, a rail on which the ends of said extensions are adapted to travel at times, and means for rapidly vibrating said rail at times.

6. A packing-machine comprising a wrapper-carrier mounted for movement and provided with members adapted to travel on rails, a second pair of rails located above said first rails, and locking means engageable with the carrier between said traveling members.

7. A packing-machine comprising a wrapper-carrier mounted for movement and having recesses 65 65, a pair of dogs pivotally-mounted and connected together, to engage in said recesses, and means for swinging one of said dogs.

8. A packing-machine comprising a wrapper-carrier, a wrapper-support movably mounted therein and having an extension working through the base of the carrier, and means located at the sealing position and adapted to act on said extension for raising the support and the filled wrapper and to hold them in the raised position during the folding of the wrapper-top.

9. A packing-machine comprising a wrapper-carrier provided with rolls, a wrapper-support movable in said carrier and having a pin working through the base of the carrier, upper and lower rails between which the carrier-rolls are engaged and means working on said pin for raising this pin and its support, to elevate the filled wrapper.

10. A packing-machine comprising a series of wrappers pivotally secured together to form a chain, means releasably engageable with the base of one of said carriers to prevent progressive movement, other means for preventing upward movement of the carrier, and mechanism for raising the wrapper and its contents to the position where the contents form an abutment to receive the infolded portions of the wrapper.

11. A packing-machine comprising a wrapper-carrier, a flap-support at the folding-level, and means for turning a flap, formed by folding the upper portion of the wrapper, onto said support.

12. A packing-machine comprising a wrapper-carrier, a flap-support located below the path of movement of the folding devices, and means for raising the level of the material in the wrapper approximately to the level of the flap-support.

13. A packing-machine comprising a wrapper-carrier, and a flap-support movable toward and from the carrier.

14. A packing-machine comprising a wrapper-carrier, a pressure device adapted to exert pressure on the wrapper contained therein, and a flap-support mounted on the pressure device.

15. A packing-machine comprising a wrapper-carrier, a flap-support having a surface extending immediately below the path of action of the folding mechanism, means for raising the wrapper to bring the level of the contents to said path of action, and means for exerting side pressure on the wrapper when in the raised position.

16. A packing-machine comprising a flap-support movable in a longitudinal path, and a flap-raising device carried by the flap-support.

17. A packing-machine comprising a flap-support movable in a horizontal path, and a flap-raising device carried thereby and adapted to be moved vertically.

18. A packing-machine comprising a flap-support movable toward and from the position in which it is adapted to receive the flap, a vertically-movable flap-raiser, and tripping means for the flap-raiser.

19. A packing-machine comprising a wrapper-carrier having open sides, a side-pressure plate movable toward and from the carrier, a flap-support mounted at the upper portion of said plate, and a flap-raiser in operative relation to said flap-support.

20. A packing-machine comprising a wrapper-carrier, and folding means for the wrapper including a reinforce-plate adapted to be positioned against that portion of the wrapper opposite to which the first fold is made.

21. A packing-machine comprising a wrapper-carrier, a folding device working toward the wrapper in one direction, and a reinforce-plate working toward the wrapper in the opposite direction.

22. A packing-machine comprising a wrapper-carrier, a flap-support movable toward the same, and a reinforce member movable into position above the flap-support.

23. A packing-machine comprising a wrapper-carrier, a flap-support movable toward the same, and a reinforce-plate pivotally mounted to swing above the flap-support, and means for swinging the reinforce-plate.

24. A packing-machine comprising a wrapper-carrier, and a reinforce-plate movable into position above the carrier and adapted to bear against the upper portion of the wrapper contained in said carrier.

25. A packing-machine comprising a wrapper-carrier having an open side, a plate movable to exert pressure against the package in the carrier at the portion thus exposed, and a reinforce-plate movable into position above said pressure-plate.

26. A packing-machine comprising a carrier having closed ends and open sides, closures for the open sides, one of which has a flap-support and is furnished with a detector mechanism, a reinforce-plate adapted to be brought into position above said flap-support, and folding mechanism working in opposition to such reinforce-plate.

27. In a packing-machine, folding means comprising a movable first folder-plate, and a reinforce-plate movable in the opposite direction and adapted to be moved out of its operative position before the return of the first folder-plate.

28. A packing-machine comprising folding mechanism provided with a pivoted lever, an arm pivoted to the lever and having a folder-plate and a rearward extension, and controlling means in operative relation to such extension.

29. A packing-machine comprising folding mechanism provided with a pivoted arm having a folder-plate and a cam-controlled extension therefrom, and means for advancing said pivoted arm at times.

30. In a packing-machine, folding mechanism comprising a pivoted lever, an arm pivotally mounted on the lever and having a folding-blade and a rearward extension, and a vertically-movable cam for controlling the horizontal position of such extension.

31. In a packing-machine, folding mechanism comprising a lever, an arm pivoted on the lever and having a folder-plate and a rearward extension provided with a bearing, a standard mounted for movement and having a cam-surface on which the bearing is designed to travel, and means for moving said standard vertically.

32. In a packing-machine, folding mechanism comprising a first folder-plate mounted for horizontal reciprocation, and folder-blades located at the sides of the path in which the first blade moves, said latter folder-blades being each mounted on a vertical shaft.

33. In a packing-machine, folding mechanism comprising a first folder-plate, a flap-support adapted to form an extension of the top surface thereof, and means for inturning the side portions of the wrapper and pressing the flap formed thereby onto the flap-support.

34. In a packing-machine, folding mechanism comprising a first folder-plate, and a flap-support adapted to be moved into position to form a supporting extension to said plate.

35. In a packing-machine, folding mechanism comprising a folder-plate adapted to make the first fold in the front portion of the wrapper, a flap-support mounted for movement at that portion of the machine opposite the first folder, means for actuating said parts in succession, and mechanism for pressing the last folds, or flap, of the wrapper onto said support.

36. In a packing-machine which includes a series of carriers for packages having open ends, folding mechanism comprising a folder-plate 211 having the curved edges 212 and 213, and the lip 214, the edge 213 being cut away to form a clearance space.

37. In a packing-machine which includes a series of movable package-carriers, a shaft rotatably mounted in a movable bearing, a folder-blade mounted at the upper portion of the shaft, means for rotating the shaft, and means for moving the bearing.

38. In a packing-machine which includes a series of movable package-carriers, folding mechanism comprising a shaft journaled on a fixed bearing and provided with a gear a bearing-support mounted to swing on said shaft, a second shaft journaled in said swinging bearing, a gear on the second shaft meshing with the gear on the first shaft, a blade on said second shaft, means for driving the first shaft, and means for swinging the bearing of the second shaft.

39. In a packing-machine which includes a series of movable package-carriers, folding mechanism comprising a shaft journaled in a fixed bearing, means for rotating said shaft, a bearing-support mounted to swing on said shaft, a shaft journaled in said swinging bearing and having a portion adapted to be received in an open bearing, a blade on said second shaft, means for transmitting motion from the first shaft to the second shaft, an open bearing fixed in relation to said extension, and means for moving said extension into and out of said bearing at times.

40. In a packing-machine folding mechanism comprising a swinging bearing, a support therefor, a shaft journaled in said bearing and provided with a folder-blade, said shaft having an engageable extension and a laterally-extending arm having a stud, an open bearing fixed in relation to said shaft, a cam-guide with which the stud on said arm is engageable to swing said bearing, and means for rotating the shaft.

41. In a packing-machine, folding mechanism comprising a fixed plate having an open bearing and a cam-slot concentric for a portion of its extension, with said bearing and eccentric for another portion of its extension with said bearing, a swinging bearing, a shaft journaled in said bearing and having a portion, engageable with said bearing, and a laterally-extending arm having a stud engaged in said cam-slot, a blade on said shaft, and means for rotating the shaft alternately in opposite direction.

42. In a packing-machine folding mechanism comprising a folder-blade and a creaser-plate, and a shaft on which both of said blades are mounted.

43. In a packing-machine, folding mechanism comprising a shaft journaled in bearings, a folder-blade fixed thereon, and a creaser-blade mounted for independent movement on said shaft.

44. In a packing-machine, folding mechanism comprising a shaft journaled in bearings, a folder-blade fixed on the shaft, a creaser-blade mounted for independent movement in one direction on said shaft, means for rotating the shaft, and means for moving the creaser-plate independently.

45. In a packing-machine, folding mechanism comprising a shaft journaled in bearings, a folder-plate fixed on a shaft, a creaser-plate mounted on said shaft for independent movement, the bottom surfaces on said plates extending approximately in the same plane.

46. In a packing-machine folding mechanism comprising a shaft rotatably mounted, a folder-plate fixed thereon, a creaser-plate loosely mounted on said shaft and having an extension, a spring connection between the creaser-plate and the shaft, and a stop for intercepting the extension of the creaser-blade.

47. In a packing-machine, folding mechanism comprising a shaft rotatably mounted, a folder-blade fixed to the shaft, a creaser-plate loosely mounted on the shaft and having an extension, a spring connecting the creaser-blade with the shaft, and means, adapted to engage said extension for moving the crease-blade against the action of the spring.

48. In a packing-machine, folding mechanism comprising a shaft rotatably mounted, means for driving the shaft, a folder-blade fixed on the shaft, a creaser-blade, having an extension, loosely mounted on the shaft, a spring connection between the creaser-blade and the shaft, and a pair of stops, one of which is movable, located at the ends of the arc of movement of the creaser-blade extension.

49. In a packing-machine, folding mechanism comprising a shaft rotatably mounted, a folder-blade fixed on said shaft, a creaser-blade loosely mounted on the shaft and having an extension, a spring connecting the creaser-plate and the shaft, and movable means for engaging said extension of the creaser-plate, as this plate reaches its forward limit of movement, to move said extension and partially retract the creaser-plate.

50. In a packing-machine, folding mechanism comprising a first folder-plate adapted to turn down the front side of the wrapper onto the contents, and a second folder-plate mounted to swing immediately above said first plate to press inward its corresponding end portion of the wrapper and to flatten down the rear portion of the wrapper, thus drawing inward the opposite end portion of the wrapper.

51. In a packing-machine, folding mechanism comprising a first folder-plate adapted to turn down the front portion of the wrapper, a second folder-plate working over the first folder-plate to fold inward its corresponding end portion of the wrapper and to press outward the rear portion of the wrapper, thus drawing the opposite end portion of the wrapper inward, said second plate having a lip adapted to be engaged under the edge of the last-mentioned fold and to effect a crease at the folded portion thereof.

52. In a packing-machine, folding mechanism comprising a first folder-plate adapted to fold inward the front portion of a wrapper, a shaft rotatably mounted, a folder-plate fixed on said shaft, and a creaser-plate loosely mounted on said shaft and connected therewith by a spring, said second-mentioned folder-plate and crease-plate working above the first folder-plate.

53. In a packing-machine, folding mechanism comprising a flap-support, means for lifting the flap therefrom at times, a folder-plate movable over said support to press the wrapper-flap thereon and adapted to engage under said flap, when the same is lifted, on the return movement.

54. In a packing-machine, folding mechanism comprising means for turning inward the front side portion of the wrapper, means for turning inward the end portions thereof and forming a rearwardly-extending flap, a creaser-plate adapted to be positioned above and approximately at the juncture of this flap with the main portion of the wrapper, and means for turning this flap over the edge of the creaser-plate, and other means for retracting the creaser-plate before the flap is entirely turned down thereon.

55. In a packing-machine folding mechanism comprising a shaft rotatably mounted, a folder-plate fixed to said shaft, a creaser-plate loose on said shaft, a spring for exerting pressure on the creaser-plate in one direction, means for rotating the shaft to carry said plates over the end of the package, means for limiting the movement of the creaser-plate to position it while the movement of the folder-plate is continued, and means for partially retracting the creaser-plate after the return movement of the folder-plate.

56. In a packing-machine, folding mechanism comprising a shaft rotatably mounted, a folder-plate fixed on said shaft, and a creaser-plate loosely mounted on said shaft, said plates being constructed and combined to engage one with the other whereby the movement of the folder-plate in one direction may cause the engagement and movement of the creaser-plate.

57. In a packing-machine, folding mechanism comprising a shaft rotatably mounted, a folding-plate fixed on said shaft, a creaser-plate loosely mounted on said shaft, means for rotating the shaft, means for positioning the creaser-plate at a predetermined point while the movement of the folder-plate continues, and a glue-applying means working on the surface exposed by the separation of the blades.

58. In a packing-machine, sealing mechanism comprising a guide-cam, a frame mounted for movement about said cam and provided with a bearing normally adapted to work on said cam, a glue-roll in said frame, and means for holding said bearing out of contact with said cam at times.

59. In a packing-machine, sealing mechanism comprising a guide-cam, a frame provided with a bearing, normally working on said cam, and with a glue-roll, arms mounted to swing, on which said frame is pivoted, a latch carried by one of said arms and engageable with a portion of said frame to hold the bearing thereof from contact with said cam, and means, actuated by detector mechanism for releasing said latch.

60. In a packing-machine, the combination with folding mechanism, of a sealing mechanism thereabove and comprising a fixed guide-cam, a shaft mounted to rotate transversely to said cam, arms on the shaft, a pivoted latch carried by one arm, a frame pivoted to said arms and provided with a glue-roll and with a bearing adapted to work on said cam, a catch on said frame with which the latch engages, means controlled by the presence of a package at the sealing position for releasing said latch, and a spring for drawing the bearing toward the cam.

61. In a packing-machine, the combination with the cam 316, of the shaft 191 journaled in bearings, the arms 307 fixed to said shaft, the frame 310 pivotally mounted on said arms and provided with the bearings 313 and the roll 311 and having the catch 314, the latch 309 pivoted on the arm 307 and in engagement with the catch 314, the spring for drawing the bearing 313 toward the cam, the tripper-arm 305 mounted to swing on the shaft 191, and detector mechanism in controlling relation to said tripper.

62. A packing-machine comprising a series of open-sided package-carriers, pressure devices mounted for movement toward and from said carriers, mechanism for moving said pressure devices, and means for adjusting said mechanism to limit the movement of the pressure devices.

63. A packing-machine comprising a series of open-sided package-carriers, a frame forming part of the supporting mechanism thereof, guides formed in said frame, slides working in said guides and provided with pressure-plates, shafts journaled in bearings in said frame, arms fixed on said shafts and operatively connected with said slides, a lever fixed to one of said shafts and having a segmental gear, means for swinging the lever, an arm loose on the second shaft and having a segmental gear complemental to the first-mentioned gear, a second arm fixed to said last-mentioned shaft, and a screw engaged with said arms.

64. In a packing-machine, the combination with a series of open-sided package-carriers mounted for intermittent movement, of side pressure devices movably mounted at the points of rest of the carriers, and top pressure devices mounted and positioned to exert pressure on the sealed tops of the packages at said points of rest.

65. In a packing-machine, the combination with the shaft 265 and the arm 268 fixed thereon, of the pressure-lever 266 mounted to swing on said shaft and having the end 272, the spring 270 connecting said lever and said arm, and means for rocking said shaft.

66. In a packing-machine, the combination with a glue-roll, having a gear, and a frame pivotally mounted in which the roll is journaled, of a glue-reservoir, a glue-supply roll rotatably mounted therein and furnished with a gear, the drive-shaft, a gear thereon engaging the gear of the supply-roll, a small gear on said shaft, an arm pivoted on said shaft, and an idle-gear rotatably mounted on said arm and meshing with said small gear whereby when the glue-roll is in receiving relation to the supply-roll said idle-gear is adapted to be in driving engagement with the gear of the glue-roll.

67. In a packing-machine, the combination with the movable pressure-plate 128 having the flap-support 129, of the rod 130 movably mounted in a perforation of said plate, and the bell-crank lever 133 pivotally supported on the flap-support and having its arm 132 pivoted to said rod 130, of a tripping mechanism operatively connected with said lever 133.

68. The combination with the pressure-plate 128 having the flap-support 129 and the ear 134, the spring-retracted pin 137 working through perforations in said support and in said ear, the bracket 135 on said plate 128, and the tripper 136 pivoted on said bracket and engaging said pin 137, of tripping mechanism adapted to depress the outer end of said tripper 136 at times.

69. A packing-machine comprising a feeding-hopper having a delivery-opening, a rail movably mounted beneath said opening, means for vibrating said rail, a series of wrapper-carriers mounted for movement between the hopper and said rail, and a shaker mechanism in each of said carriers having an extension adapted to travel on said rail.

70. A packing-machine comprising a series of wrapper-carriers pivotally connected together and having open sides, a wrapper-support movably mounted in each of said carriers and having a pin working through a perforation in the bottom of the carrier, the lever 139 pivotally mounted at the sealing position and having the end 140 adapted to engage the end of the wrapper-support pin, the plates 126 and 128 mounted for movement toward and from the open sides of the carrier when in the sealing position, means for swinging the lever 139, and means for moving the plates 126 and 128.

In testimony whereof I affix my signature in presence of two witnesses.

GEORGE R. WYMAN.

Witnesses:
HENRI E. DAVENPORT,
JOHN J. SPILLANE.